(12) United States Patent
Walker

(10) Patent No.: US 6,448,311 B1
(45) Date of Patent: Sep. 10, 2002

(54) CEMENT FLUID LOSS ADDITIVE

(75) Inventor: Michael L. Walker, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 52 days.

(21) Appl. No.: 09/619,346

(22) Filed: Jul. 19, 2000

(51) Int. Cl.⁷ .............................. C09K 7/00; C08F 2/00
(52) U.S. Cl. ............................ 524/5; 523/130; 526/73; 526/89; 526/287; 526/307.4
(58) Field of Search .............................. 523/130; 524/5; 526/73, 89, 287, 307.4

(56) References Cited

U.S. PATENT DOCUMENTS

| | | | |
|---|---|---|---|
| 4,309,523 A | * | 1/1982 | Engelhardt et al. ......... 526/240 |
| 5,092,935 A | | 3/1992 | Crema et al. |
| 5,217,531 A | | 6/1993 | Cheung |
| 5,336,316 A | | 8/1994 | Dawson et al. |
| 5,362,324 A | | 11/1994 | Cerulli et al. |
| 5,728,210 A | | 3/1998 | Moran et al. |

FOREIGN PATENT DOCUMENTS

| | | |
|---|---|---|
| EP | 0 100 671 A1 | 2/1984 |
| JP | AN2001-619836 | 5/2001 |
| WO | WO 99/26991 | 6/1999 |

* cited by examiner

*Primary Examiner*—Kriellion A. Sanders
(74) *Attorney, Agent, or Firm*—Paula D. Morris & Associates P.C.

(57) ABSTRACT

A novel method for making improved cement fluid loss additives comprising copolymers of acrylamide having desirable viscosity and fluid loss control properties. The method combines (1) the use of oxygenated make-up water to dissolve acrylamide monomers, derivatives or mixtures thereof to form a reaction mixture for polymerization of the monomers with (2) a second "condition" or set of conditions. The second "condition" or set of conditions is either (a) using of two heating stages to induce polymerization, or (b) adding a small amount of acrylic acid to the reaction mixture before exposing the reaction mixture to a temperature sufficient to polymerize the monomers. The two heating stages of (a) involve (i) an initial, lower temperature stage followed by (ii) a higher temperature stage.

67 Claims, No Drawings

CEMENT FLUID LOSS ADDITIVE

FIELD OF THE INVENTION

The present invention relates to improved additives for preventing fluid loss from cement.

BACKGROUND OF THE INVENTION

Cement compositions are used in the oil and gas industry to cement the annular space in the wellbore between the surrounding formation and the pipe or casing. A cement slurry typically is pumped down the inside of the casing and back up the outside of the casing through the annular space. The amount of water used in forming the cement slurry will vary depending upon the type of hydraulic cement selected and on the relevant job conditions. The amount of water used can vary over a wide range, depending upon such factors as the required consistency of the slurry and upon the strength requirement for a particular job.

Many times, the hydraulic cement must be placed within or next to a porous medium, for example earthen strata in the wellbore. When this happens, water tends to filter out of the slurry and into the strata during placement and setting of the cement. Many difficulties are related to an uncontrolled fluid loss of this type. Such difficulties include an uncontrolled setting rate, improper placement of the slurry, impaired strength properties, and contamination of the surrounding strata. These conditions are all undesirable in oil and gas well cementing operations.

In order to lessen the fluid loss from the aqueous cement slurry, various materials have been employed in the past. One such material is a copolymer of an acrylamide and acrylic acid. This fluid loss material has the ability to maintain fluid loss control over a wide temperature range, functions well in the presence of salts, and is superior to cellulose base additives when chloride salt accelerators are present.

The effectiveness of a fluid loss additive is related to the size or the molecular weight of the polymer. A "large" polymer, or a polymer with a higher molecular weight, generally is more effective in preventing excessive fluid loss from a cement slurry than a "small" polymer, or a polymer with a lower molecular weight. However, large polymers have a negative impact on the properties of the cement slurry. The most common problem associated with large polymers as additives is an unwanted and deleterious increase in viscosity of the cement slurry.

Cement fluid loss additives are needed which prevent excessive fluid loss and which also impart little or no added viscosity to the cement slurry.

SUMMARY OF THE INVENTION

The present invention provides a method of making a cement fluid loss additive comprising providing oxygenated water comprising a dissolved oxygen content, mixing a quantity of the oxygenated water with acrylamide monomers to form a reaction mixture, and subjecting the reaction mixture to conditions effective to induce polymerization of the monomers to produce polymers. The dissolved oxygen content is effective to produce polymers which will maintain a cement slurry at an effective viscosity. The conditions are effective to produce polymers which will maintain effective fluid loss control.

DETAILED DESCRIPTION OF THE INVENTION

The present invention provides a novel method for making improved cement fluid loss additives comprising polymers of acrylamide having desirable viscosity and fluid loss control properties. The method combines (1) the use of oxygenated make-up water to dissolve the acrylamide monomers, their derivatives or combinations thereof, with (2) a second "condition" or set of conditions. Preferably, 2-acrylamido-2-methylpropanesulfonic acid ("AMPS") monomers are used to form a reaction mixture for polymerization of the monomers with other acrylamide monomers, with (2) a second "condition" or set of conditions. The second "condition" or set of conditions is either (a) using of two heating stages to induce polymerization, or (b) adding a small amount of acrylic acid to the reaction mixture before exposing the reaction mixture to a temperature sufficient to polymerize the monomers. When using two heating stages to induce polymerization, the two heating stages involve (i) an initial, lower temperature stage followed by (ii) a higher temperature stage.

Oxygenated water is used to prepare the reaction mixture. The concentration of dissolved oxygen (DO) in the reaction mixture determines the viscosity of the final product. Hereafter, the phrases "oxygen concentration" or "oxygen content" refer to the dissolved oxygen concentration or the dissolved oxygen content. In reaction mixtures where the starting dissolved oxygen concentration is below about 1000 ppb, polymerization is observed during the initial heating period. While the resulting polymers do function as fluid loss additives, the polymers are excessively viscous, giving Brookfield uncorrected readings of greater than about 80,000. Desirable viscosities for the polymer solution are from about 1000 to about 40,000 units in Brookfield uncorrected readings, preferably about 1500–10,000 units.

When dissolved oxygen concentrations in the reaction mixture are maintained between about 2000 ppb and about 4000 ppb, no noticeable viscosity increases are observed during an initial 3 hour heating period at about 40° C., Reaction mixtures which contain saturated levels of dissolved oxygen, 7000 ppb to 8000 ppb, do not significantly increase in viscosity upon heating even to about 90° C.; however, the resulting products do not provide adequate fluid loss control properties.

Without limiting the invention to any particular mechanism of action, the dissolved oxygen in the make-up water appears to inhibit the polymerization of the AMPS and acrylamide monomers. Increasing the concentration of dissolved oxygen in the reaction mixture appears to prevent the formation of excessively large copolymers. Reaction charges using water with dissolved oxygen concentrations below about 1000 ppb permit significant polymerization during the initial heating period. This results in higher molecular weight polymers, and excessive viscosity of the cement slurry. Reaction charges using water with a high concentration of dissolved oxygen—at saturation values, or approximately 8000 ppg oxygen—produce products and cement slurries with a low viscosity. However, where the dissolved oxygen is at saturation level, the polymers do not prevent fluid loss—presumably due to the relatively small molecular size of the copolymer. The small molecular size of the polymer allows fluid to pass more easily between the solid particles of the slurry. Using the API-RP-10B test, only fluid losses of about 50 mL or less are considered acceptable.

Water having a known and stable variety of dissolved oxygen contents is available from a variety of sources. Suitable sources of water for deoxygenation include, but are not necessarily limited to tap water, distilled water, and deionized water. Suitable water sources may be deoxygenated using known methods including, but not necessarily limited to purging, use of oxygen scavengers, and displacement and heating to a specified temperature.

In order to achieve a make-up water for the reaction having a desired dissolved oxygen content, it is preferable to downwardly adjust the dissolved oxygen content of water that previously has been oxygenated to a higher level and used to dissolve the AMPS. For example, the dissolved oxygen content of highly oxygenated water can be reduced using time limited delivery of a specific flow rate of an inert gas, such as nitrogen gas. Or, water having different known dissolved oxygen contents may be mixed to achieve a desired dissolved oxygen content. For example, water having a dissolved oxygen content of about 2000 ppb may be prepared by mixing about 1 part water having a relatively high dissolved oxygen content of about 8000 ppb with about 3 parts water having a relatively low dissolved oxygen content of about 100 ppb. The final dissolved oxygen content may be verified using an oxygen meter.

An acrylamide comonomer that may be used in the reaction mixture may be commercially available "liquid" acrylamide, which typically contains about 50% solids, or reagent grade acrylamide. A preferred acrylamide is ACRYL-50, a liquid acrylamide product which is available from AmResco, Inc., Solon, Ohio.

Preferred dissolved oxygen contents for most acrylamide monomer combinations are from about 2000 ppb to about 4000 ppb. The preferred dissolved oxygen content may vary with the type of monomers used. For example, Lubrizol Corporation, Wickliffe, Ohio, supplies two commercial grades of solid 2-acrylamido-2-methylpropanesulfonic acid ("AMPS") monomers—AMPS 2404 and AMPS 2401. These two monomers differ by an impurity index that relates to the concentration of polymerization inhibitors—inhibitors that affect molecular weight maxima. AMPS 2404 provides polymers with maximum molecular weight and minimum size distribution. AMPS 2401 provides products with maximum size distribution, but does so at the expense of molecular weight of the polymer.

The differences appear to be associated with polymerization inhibitors found in the two AMPS monomers. Using AMPS 2404, the dissolved oxygen concentration preferably is lower using liquid acrylamide solutions than when reagent grade acrylamide is used. A similar decrease in dissolved oxygen content is preferred when AMPS 2401 and reagent grade acrylamide are used. Products made with AMPS 2404 and reagent grade acrylamide preferably are prepared using make-up water with a DO content of about 4000 ppb. Products made with AMPS 2401 and reagent grade acrylamide preferably are prepared using water with a DO content of about 2000 ppb.

In the examples, polymerization reactions with liquid acrylamide were carried out only with AMPS 2404. Using AMPS 2404 and the liquid acrylamide solution ACRYL-50, dissolved oxygen concentrations were lowered from about 4000 ppb to about 2000 ppb in order to obtain products having desirable properties. Most likely, a mixture of AMPS 2401 and liquid acrylamide also will require a reduction in dissolved oxygen concentration in order to obtain products having desirable properties, possibly even to 1000 ppb dissolved oxygen or lower.

Products obtained using AMPS 2401 produced cement slurries having acceptably low initial viscosities, and fluid-loss data showed adequate performance. However, the volume of fluid loss was significantly higher than that obtained for products synthesized from AMPS 2404: 30 mL for 2401 vs. 5 mL for 2404. Because of this, and based solely on the criterion of fluid-loss control, AMPS 2404 is a preferred comonomer.

In a preferred embodiment, oxygenated water and preferably equimolar amounts of a first amount of acrylamide monomers and a second amount of AMPS monomers are charged to the reactor. Preferably, the oxygenated water used to dissolve the monomers has a relatively high dissolved oxygen content, preferably about 8000 ppb. After complete dissolution of the solids, the solution is purged with an inert gas, preferably nitrogen. An initiator system is added under a blanket of the inert gas.

Suitable initiator systems include, but are not necessarily limited to persulfate, thiosulfate, sulfite, bisulfite anions or any combination thereof A preferred initiator system is a combination of sodium persulfate and sodium thiosulfate, preferably dissolved in water. The reaction mixture is heated from about 30° C. to about 55° C., preferably about 40° C., for a time period of from about 1 to about 8 hours, preferably about three hours. The time and temperature of this initial heating period apparently are important to maximize fluid loss control properties.

After the initial "low temperature" heating period, the reaction mixture is heated to a higher temperature effective to induce polymerization of the monomers. Suitable temperatures are from about 60° C. to about 100° C., preferably about 90° C. Suitable times are from about 1 to about 8 hours, preferably about three more hours. An inert gas, preferably nitrogen, may or may not be flowed through the reaction vessel during heating. The second heating period initiates and completes the polymerization reaction. In this embodiment, the two step heating sequence is required in order to obtain a polymer with adequate fluid loss properties.

Polymerization reactions performed without the use of the initial heating period gave resulting solutions which did nor perform in a cement fluid loss test with one exception, which is a second embodiment of the invention. Similar product performance is obtained without the need for the initial, low temperature heating step when a small amount of from about 0.01 wt % to about 10.0 wt %, preferably about 0.1% wt % acrylic acid is added to the reaction mixture before heating. Acrylic acid is available from a variety of commercial sources. After addition of acrylic acid, the reaction mixture may be heated directly to the polymerization temperature, preferably about 90° C.

The invention will be better understood from the following examples, which are illustrative only should not be construed as limiting the invention to a particular embodiment. In all of the following examples, the fluid loss was tested by API RP-10B.

EXAMPLE I

Polymerization reactions with approximately equal molar amounts of acrylamide and 2-acrylamido-2-methylpropanesulfonic acid (AMPS) were carried out with various amounts of dissolved oxygen. At saturation levels of dissolved oxygen in the make-up water—approximately 8000 ppb dissolved oxygen—the resulting polymer solution had a viscosity of 64 units (measured in uncorrected Brookfield readings). This material provided 102 mL of fluid in a fluid loss test at 1000 psi differential pressure. When dissolved oxygen levels were reduced to 4000 ppb, viscosity of the resultant polymer solution was 1925 Brookfield units (uncorrected) and the fluid leak off value was 5 mL. A control experiment in which dissolved oxygen levels were reduced to approximately 100 ppb produced a polymer solution with a viscosity of 81,760 Brookfield units (uncorrected). This material provided a very low leakoff value; however, the high viscosity of the product resulted in a cement slurry with excessive resistance to flow.

Water having desired dissolved oxygen concentrations was obtained by adding an appropriate amount of deoxygenated water ($[O_2]$ <100 ppb) to an appropriate amount of oxygen saturated water ($[O_2]$ ~8000 ppb). Oxygen saturated water ($[O_2]$ ~8000 ppb) was obtained from the tap. Deoxygenated water having the following dissolved oxygen contents was prepared by purging the appropriate amount of water with nitrogen via a gas dispersion sparger tube or a single narrow opening pipette for about 20–30 minutes at flow rate of about 90 cc/min:

| Time | Sample | Flow Rate | Oxygen Conc in ppb** | |
|---|---|---|---|---|
| in min. | Size* | ml/min. | Pipette | Sparger |
| 0 | 108.8 | 120–140 | ~8000 | ~8000 |
| 1 | 108.8 | 120–140 | ~6000 | ~5000 |
| 2 | 108.8 | 120–140 | ~5000 | ~4000 |
| 3 | 108.8 | 120–140 | ~5000 | ~4000 |
| 6 | 108.8 | 120–140 | ~3000 | ~2000 |
| 9 | 108.8 | 120–140 | ~2000 | ~1000 |
| 12 | 108.8 | 120–140 | — | ~600 |
| 15 | 108.8 | 120–140 | ~1000 | ~400 |
| 30 | 108.8 | 120–140 | ~500 | ~100 |
| 0 | 1088.0 | 240–250 | ~8000 | ~8000 |
| 1 | 1088.0 | 240–250 | ~7000 | ~7000 |
| 2 | 1088.0 | 240–250 | ~7000 | ~6000 |
| 3 | 1088.0 | 240–250 | ~7000 | ~6000 |
| 6 | 1088.0 | 240–250 | ~7000 | ~5000 |
| 9 | 1088.0 | 240–250 | ~6000 | ~4000 |
| 12 | 1088.0 | 240–250 | ~5000 | ~3000 |
| 15 | 1088.0 | 240–250 | ~1000 | ~500 |
| 30 | 1088.0 | 240–250 | ~1000 | ~100 |

*Reactions were carried out in small and in large flasks. The amount of water was 10x in the large flask. Purge efficiencies depended on the amount of water used.
**Oxygen concentrations were measured using CHEMets DO kits, which are commercially available from Fisher Scientific, Houston, Texas, and comparing test vials as their color developed to standard dissolved oxygen content.

AMPS 2404 (9.0 g), obtained from Lubrizol Corporation, was dissolved in the appropriate amount of the oxygen saturated water about five minutes before the end of the nitrogen purge on the water being deoxygenated. This prevented possible premature polymerization of the monomers in the oxygenated water from which the deoxygenated water was being prepared.

A 300 mL round bottom flask was fitted with an overhead stirrer, thermocouple, and nitrogen inlet, and the flask was filled with nitrogen. ACRYL-50 (3.09 g) was mixed with the AMPS solution. When the deoxygenated water had been purged for 30 minutes, the AMPS/acrylamide solution was charged into the nitrogen filled reaction flask. With stirring, the deoxygenated water was added to the flask from a separatory or constant pressure addition funnel. At the time the deoxygenated water was added, the flask was left open to the atmosphere.

The initiator system included sodium persulfate (0.011 g) in 0.5 mL water and sodium sulfite (0.001 g) in 0.5 mL water. The initiators were added to tap water and dissolved five minutes before addition of each to the reaction flask. The initiator system was added to the reaction flask after nitrogen purging was complete. The nitrogen inlet was replaced with a condenser, and the top of the condenser was left open to the atmosphere. The reaction mixture was then heated to 40° C. for three hours. At the end of this time period, the mixture was heated to 90° C. for three hours. The results are shown below:

| Reaction # | Oxygen Conc. ppb | Viscosity* | Fluid Loss** |
|---|---|---|---|
| RX-1 | ~8000 | 64 | 102 |
| RX-2 | ~4000 | 1925 | 5 |
| RX-3 | ~2000 | 859 | 9 |
| RX-4 | ~100 | 81,760 | 10 |

*Uncorrected Brookfield readings: #5 spindle 5, 1O, 20, and 50 rpm.
**Amount of fluid, in mL collected at 1000 psi afier 30 minutes. Volumes of 50 mL or less are considered acceptable values

EXAMPLE II

The procedures of Example I were used to prepare products using a variety of monomers and a variety of dissolved oxygen contents. The results are shown below.

| AMPS Source | Acrylamide Source | Oxygen Content ppb | Viscosity* | Fluid-Loss** |
|---|---|---|---|---|
| 2404 | reagent | — | 81,760 | 10 |
| 2404 | reagent | 2000 | 1018*** | 23*** |
| 2404 | reagent | 4000 | 1925 | 5 |
| 2404 | reagent | 8000 | 64 | 102 |
| 2404 | liquid | 2000 | 1824 | 13 |
| 2404 | liquid | 4000 | 423 | 65 |
| 2401 | reagent | 2000 | 1118*** | 20*** |
| 2401 | reagent | 4000 | 457 | 30 |

*Uncorrected Brookfield readings; #5 spindle 5, 1O, 20, and 50 rpm.
**Amount of fluid, in mL collected at 1000 psi after 30 minutes. Volumes of 50 mL or less are considered acceptable values
***Average of two or more values

EXAMPLE III

A 300 mL round bottom flask was fitted with an overhead stirrer, thermocouple, and nitrogen inlet. Water (108.0 g) having a DO content of about 440 ppb, a 1:1 molar ratio of AMPS 2404 (9.0 g), and reagent grade acrylamide (3.09 g), obtained from Aldrich Chemical Co., were charged, and after complete dissolution of the solids, the solution was purged with nitrogen via an open ended plastic pipette for 15 minutes at a flow rate of about 250 cc/min. The initiator system was added under a nitrogen blanket. The nitrogen inlet was replaced with a condenser. The top of the condenser was kept open to the atmosphere. The flask was then heated to 40° C. for three hours. At the end of this time period, the mixture was heated to 90° C. for three hours.

The initiators for the reaction were sodium persulfate (0.011 g) in 0.5 mL water and sodium sulfite (0.001 g) in 0.5 mL water. These solid sulfur compounds were added to water and dissolved five minutes before addition to each of the reaction flasks. The following were the results:

| Reaction # | Heat Cycles | Viscosity* | Fluid Loss** |
|---|---|---|---|
| RX-5 | 40° C. 3 hrs | 4000 | >100 |
| RX-6 | 40° C. 3 hrs + 90° C. 3 hrs | — | 6 |
| RX-7 | 90° C. 6 hrs | 70 | 150 |

*Uncorrected Brookfield values: #5 spindle at 5, 10, 20 and 50 rpm
**Amount of fluid, in mL, collected at 1000 psi in 30 minutes. Volumes of 50 mL or less are considered acceptable values.

EXAMPLE IV

An approximate 1:1 mole ratio of AMPS 2404 (9.00 g) obtained from Lubrizol Corporation and reagent grade acrylamide (3.09 g) obtained from Aldrich Chemical Co., were dissolved in water containing 8000 ppb dissolved oxygen. To this solution, water containing dissolved oxygen at 100 ppb was added as described in Example 1. The following amounts of both water sources were mixed to result in a total of 108.8 mL of water having the following total dissolved oxygen contents:

| mL 8000 ppb "DO" water | mL 100 ppb "DO" water | Total ppb oxygen |
| --- | --- | --- |
| 108.8 mL | 0 mL | 8000 |
| 54.4 | 34.4 | 4000 |
| 27.2 | 81.6 | 2000 |
| 0 mL | 108.8 mL | 100 |

Sodium persulfate (0.011 g) and sodium sulfite (0.001 g) were used as initiators, and added as described in Example 1. The mixture was heated to 40° C. for 3 hours followed by heating to 90° C. for an additional 3 hours.

The viscosity and fluid loss of the resulting solutions was measured and the results are shown below.

| Oxygen Concentration | Viscosity* | Fluid loss in mL** |
| --- | --- | --- |
| 8000 ppb | 64 | 102 |
| 4000 ppb | 1925 | 5 |
| 2000 ppb | 859 | 9 |
| 100 ppb | 81,760 | 10 |

**Uncorrected Brookfield readings #5 spindle at 5,10, 20, 50 rpm's.
***Amount of fluid, in mL, collected at 1000 psig differential pressure after 30 minutes Volumes of 50 mL or less are considered acceptable.

EXAMPLE V

A 1:1 mole ratio of AMPS 2404 (9.0 g) and reagent grade acrylamide (3.09 g) and the following amounts of acrylic acid obtained from Aldrich Chemical Co. were dissolved in water containing 8000 ppb dissolved oxygen. To this solution, water containing dissolved oxygen at 100 ppb was added, as described in Example 1. The amounts of the two water sources were adjusted to provide the desired level of dissolved oxygen for the reaction. The total amount of water used was 108.8 g in each case. Sodium persulfate (0.011 g) and sodium sulfite (0.001 g) were used as initiators, and were added to the mixture as described in Example 1. The mixture was heated to 90° C. for 3 hours. The following results were observed:

| Oxygen Concentration | Acrylic Acid Amount | Viscosity* | Fluid loss in mL** |
| --- | --- | --- | --- |
| 2000 ppb | 0.1 | 3355 | 20 |
| 2000 ppb | 0.1 | 4811 | 3 |
| 2000 ppb | 0.2 | — | 17 |
| 2000 ppb | 0.4 | — | 72 |
| 8000 ppb | none | — | >100 |

*Uncorrected Brookfield readings: #5 spindle at 5, 10, 20, 50 rpm's
**Amount of fluid, in mL, collected at 1000 psig differential pressure after 30 minutes. Volumes of 50 mL or less are considered acceptable.

Persons of ordinary skill in the art will appreciate that many modifications may be made to the embodiments described herein without departing from the spirit of the present invention. Accordingly, the embodiments described herein are illustrative only and are not intended to limit the scope of the present invention.

I claim:

1. A method of making a cement fluid loss additive comprising:

providing oxygenated water comprising a desired dissolved oxygen content;

mixing a quantity of said oxygenated water with acrylamide monomers comprising a first amount of acrylamide to form a reaction mixture; and, subjecting said reaction mixture to conditions effective to induce polymerization of said monomers to produce polymers;

said desired dissolved oxygen content being effective to produce polymers which, upon mixing at a sufficient concentration in a cement slurry, maintain said cement slurry at an effective viscosity; and said conditions being effective to produce polymers which, upon mixing at a sufficient concentration in a cement slurry, maintain effective fluid loss control.

2. The method of claim 1 wherein said desired dissolved oxygen content is from about 1000 ppb to about 6000 ppb.

3. The method of claim 1 wherein said conditions comprise:

initially exposing said reaction mixture to a first temperature for a first period of time; and thereafter subjecting said reaction mixture to a second temperature for a second period of time effective to induce said polymerization of said monomers, said first temperature being less than said second temperature.

4. A method of making a cement fluid loss additive comprising:

providing oxygenated water comprising a desired dissolved oxygen content;

mixing a quantity of said oxygenated water with monomers comprising a first amount of acrylamide and a second amount of 2-acrylamido-2-methylpropanesulfonic acid to form a reaction mixture; and, subjecting said reaction mixture to conditions effective to induce polymerization of said monomers to produce copolymers;

said desired dissolved oxygen content being effective to produce polymers which, upon mixing at a sufficient concentration in a cement slurry, maintain said cement slurry at an effective viscosity; and said conditions being effective to produce polymers which, upon mixing at a sufficient concentration in a cement slurry, maintain effective fluid loss control.

5. A method of making a cement fluid loss additive comprising:

providing oxygenated water having a desired dissolved oxygen content of from about 1000 ppb to about 6000 ppb;

mixing a quantity of said oxygenated water with monomers comprising a first amount of acrylamide and a second amount of 2-acrylamido-2-methylpropanesulfonic acid to form a reaction mixture; and exposing said reaction mixture to a first temperature for a first period of time; and thereafter subjecting said reaction mixture to a second temperature for a second period of time effective to induce said polymerization of said monomers, said first temperature being less than said second temperature;

said desired dissolved oxygen content being effective to produce copolymers which, upon mixing at a sufficient concentration in a cement slurry, maintain said cement slurry at an effective viscosity; and said initially exposing said reaction mixture to said first temperature for said first period of time being effective to produce copolymers which, upon mixing at a sufficient concentration with a cement slurry, maintain effective fluid loss control.

6. The method of claim 3 wherein said first temperature is about 40° C. and said second temperature is about 90° C.

7. The method of claim 5 wherein said first temperature is about 40° C. and said second temperature is about 90° C.

8. The method of claim 6 wherein said first period of time is about 3 hours and said second period of time is about 3 hours.

9. The method of claim 7 wherein said first period of time is about 3 hours and said second period of time is about 3 hours.

10. The method of claim 1 wherein said conditions comprise adding to said reaction mixture a quantity of acrylic acid, said quantity of acrylic acid being effective to maintain said effective fluid loss control.

11. A method of making a cement fluid loss additive comprising:

providing oxygenated water having a desired dissolved oxygen content of from about 2000 ppb to about 4000 ppb;

mixing a first quantity of said oxygenated water with a second quantity of acrylic acid and with a first amount of acrylamide and a second amount of 2-acrylamido-2-methylpropanesulfonic acid to form a reaction mixture; and exposing said reaction mixture to a temperature effective to induce polymerization of said monomers;

said second quantity of acrylic acid being effective to produce copolymers which, upon mixing at a sufficient concentration in a cement slurry, maintain effective fluid loss control.

12. The method of claim 1 wherein said first amount and said second amount are substantially equimolar.

13. The method of claim 5 wherein said first amount and said second amount are substantially equimolar.

14. The method of claim 11 wherein said first amount and said second amount are substantially equimolar.

15. The method of claim 10 wherein said quantity of acrylic acid is about 0.1% w/w.

16. The method of claim 11 wherein said quantity of acrylic acid is about 0.1% w/w.

17. A method of improving fluid loss properties of a cement slurry comprising mixing with said slurry said sufficient concentration of the fluid loss additive of claim 1.

18. A method of improving fluid loss properties of a cement slurry comprising mixing with said slurry said sufficient concentration of the fluid loss additive of claim 5.

19. A method of improving fluid loss properties of a cement slurry comprising mixing with said slurry said sufficient concentration of the fluid loss additive of claim 11.

20. A method of improving fluid loss properties of a cement slurry comprising mixing with said slurry said sufficient concentration of the fluid loss additive of claim 12.

21. A method of improving fluid loss properties of a cement slurry comprising mixing with said slurry said sufficient concentration of the fluid loss additive of claim 13.

22. A method of improving fluid loss properties of a cement slurry comprising mixing with said slurry said sufficient concentration of the fluid loss additive of claim 14.

23. A reaction product of acrylamide and 2-acrylamido-2-methylpropanesulfonic acid having a viscosity of from about 1000 to about 40,000 units in Brookfield uncorrected readings.

24. The reaction product of claim 23 wherein said viscosity is from about 1500 to about 10,000 units in Brookfield uncorrected readings.

25. A method of making a cement fluid loss additive comprising:

providing oxygenated water having a desired dissolved oxygen content;

mixing a first quantity of said oxygenated water with a first amount of an acrylamide and a second amount of a 2-acrylamido-2-methylpropanesulfonic acid to form a reaction mixture; and exposing said reaction mixture to a conditions effective to induce polymerization of said monomers;

said conditions being effective to produce polymers which, upon mixing at a sufficient concentration in a cement slurry, maintain effective fluid loss control.

26. The method of claim 25 wherein said desired dissolved oxygen content is from about 1000 ppb to about 6000 ppb.

27. The method of claim 25 wherein said conditions comprise: initially exposing said reaction mixture to a first temperature for a first period of time; and thereafter subjecting said reaction mixture to a second temperature for a second period of time effective to induce said polymerization of said monomers, said first temperature being less than said second temperature.

28. The method of claim 26 wherein said conditions comprise:

initially exposing said reaction mixture to a first temperature for a first period of time; and thereafter subjecting said reaction mixture to a second temperature for a second period of time effective to induce said polymerization of said monomers, said first temperature being less than said second temperature.

29. A method of making a cement fluid loss additive comprising:

providing oxygenated water having a desired dissolved oxygen content;

mixing a first quantity of said oxygenated water with a first amount of an acrylamide and a second amount of a 2-acrylamido-2-methylpropanesulfonic acid to form a reaction mixture; and exposing said reaction mixture to a conditions effective to induce polymerization of said monomers;

said desired dissolved oxygen content being effective to produce polymers which, upon mixing at a sufficient concentration in a cement slurry, maintain said cement slurry at an effective viscosity;

said conditions being effective to produce polymers which, upon mixing at a sufficient concentration in a cement slurry, maintain effective fluid loss control.

30. A method of making a cement fluid loss additive comprising:

providing oxygenated water having a desired dissolved oxygen content of from about 1000 ppb to about 6000 ppb;

mixing a first quantity of said oxygenated water with a first amount of an acrylamide and a second amount of a 2-acrylamido-2-methylpropanesulfonic acid to form a reaction mixture; and exposing said reaction mixture to a conditions effective to induce polymerization of said monomers;

said desired dissolved oxygen content being effective to produce polymers which, upon mixing at a sufficient concentration in a cement slurry, maintain said cement slurry at an effective viscosity;

said conditions being effective to produce polymers which, upon mixing at a sufficient concentration in a cement slurry, maintain effective fluid loss control.

31. The method of claim 27 wherein said desired dissolved oxygen content is effective to produce polymers which, upon mixing at a sufficient concentration in a cement slurry, maintain said cement slurry at an effective viscosity.

32. The method of claim 28 wherein said desired dissolved oxygen content is effective to produce polymers which, upon mixing at a sufficient concentration in a cement slurry, maintain said cement slurry at an effective viscosity.

33. The method of claim 27 wherein said first temperature is about 40° C and said second temperature is about 90° C.

34. The method of claim 28 wherein said first temperature is about 40° C and said second temperature is about 90° C.

35. The method of claim 32 wherein said first temperature is about 40° C. and said second temperature is about 90° C.

36. The method of claim 32 wherein said first temperature is about 40° C. and said second temperature is about 90° C.

37. The method of claim 27 wherein said first period of time is about 3 hours and said second period of time is about 3 hours.

38. The method of claim 28 wherein said first period of time is about 3 hours and said second period of time is about 3 hours.

39. The method of claim 25 wherein said conditions comprise adding to said reaction mixture a quantity of acrylic acid, said quantity of acrylic acid being effective to maintain said effective fluid loss control.

40. The method of claim 29 wherein said conditions comprise adding to said reaction mixture a quantity of acrylic acid, said quantity of acrylic acid being effective to maintain said effective fluid loss control.

41. The method of claim 25 wherein said desired dissolved oxygen content is from about 2000 ppb to about 4000 ppb.

42. The method of claim 25 wherein
said mixing further comprises mixing a second quantity of acrylic acid to produce said reaction mixture; and
exposing said reaction mixture to a temperature effective to induce polymerization of said monomers;
said second quantity of acrylic acid being effective to produce copolymers which, upon mixing at a sufficient concentration in a cement slurry, maintain effective fluid loss control.

43. The method of claim 42 wherein said desired dissolved oxygen content is from about 2000 ppb to about 4000 ppb.

44. The method of claim 25 wherein said first amount and said second amount are substantially equimolar.

45. The method of claim 26 wherein said first amount and said second amount are substantially equimolar.

46. The method of claim 27 wherein said first amount and said second amount are substantially equimolar.

47. The method of claim 28 wherein said first amount and said second amount are substantially equimolar.

48. The method of claim 29 wherein said first amount and said second amount are substantially equimolar.

49. The method of claim 30 wherein said first amount and said second amount are substantially equimolar.

50. The method of claim 31 wherein said first amount and said second amount are substantially equimolar.

51. The method of claim 32 wherein said first amount and said second amount are substantially equimolar.

52. The method of claim 32 wherein said first amount and said second amount are substantially equimolar.

53. The method of claim 39 wherein said first amount and said second amount are substantially equimolar.

54. The method of claim 40 wherein said first amount and said second amount are substantially equimolar.

55. The method of claim 41 wherein said first amount and said second amount are substantially equimolar.

56. The method of claim 39 wherein said quantity of acrylic acid is about 0.1% w/w.

57. The method of claim 40 wherein said quantity of acrylic acid is about 0.1% w/w.

58. The method of claim 42 wherein said quantity of acrylic acid is about 0.1% w/w.

59. The method of claim 43 wherein said quantity of acrylic acid is about 0.1% w/w.

60. A method of improving fluid loss properties of a cement slurry comprising mixing with said slurry said sufficient concentration of a reaction product of acrylamide and 2-acrylamido-2-methylpropanesulfonic acid having a viscosity of from about 1000 to about 40,000 units in Brookfield uncorrected readings.

61. The method of claim 60 wherein said viscosity is from about 1500 to about 10,000 units in Brookfield uncorrected readings.

62. A cement slurry comprising a reaction product of acrylamide and 2-acrylamido-2-methylpropanesulfonic acid having a viscosity of from about 1000 to about 40,000 units in Brookfield uncorrected readings.

63. The cement slurry of claim 62 wherein said viscosity is from about 1500 to about 10,000 units in Brookfield uncorrected readings.

64. A cement slurry comprising the fluid loss additive of claim 1.

65. A cement slurry comprising the fluid loss additive of claim 11.

66. A cement slurry comprising the fluid loss additive of claim 25.

67. A cement slurry comprising the fluid loss additive of claim 29.

* * * * *